Figure 1:
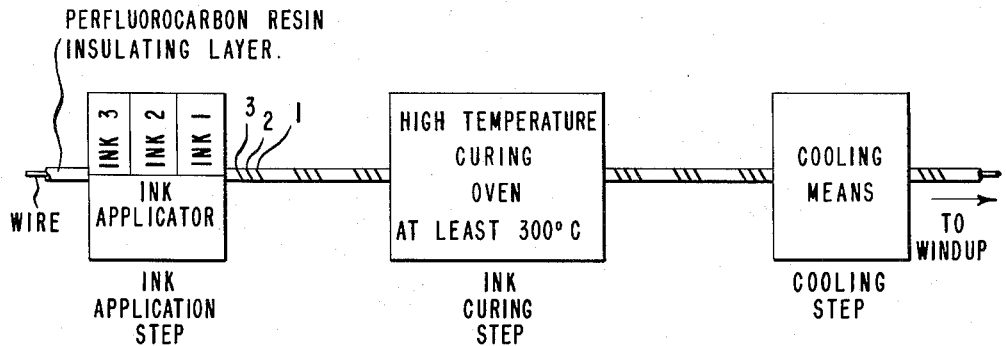

Aug. 29, 1961        LE VERNE K. OSDAL        2,998,332
    METHOD FOR MARKING A PERFLUOROCARBON RESIN
          SURFACE AND COMPOSITION THEREFOR
                 Filed June 23, 1959

INVENTOR
Le VERNE K. OSDAL

BY Charles E. Bartsch
                        AGENT

United States Patent Office 2,998,332
Patented Aug. 29, 1961

2,998,332
METHOD FOR MARKING A PERFLUOROCARBON RESIN SURFACE AND COMPOSITION THEREFOR
Le Verne K. Osdal, Springfield, Pa., assignor to E. I. du Pont de Nemours and Company, Wilmington, Del., a corporation of Delaware
Filed June 23, 1959, Ser. No. 822,212
15 Claims. (Cl. 117—212)

This invention relates to an aqueous dispersion ink composition for marking perfluorocarbon resin surfaces with indicia for identification purposes, and especially for marking color-coding stripes on electrical hook-up wire insulated with a polymer of a perfluorohydrocarbon such as tetrafluoroethylene or an interpolymer of tetrafluoroethylene and hexafluoropropylene.

Perfluorocarbon resins characterized by outstanding chemical, electrical, heat and abrasion resistance have found significant utility in diverse fields where one or more of these characteristics are pertinent. These characteristics are particularly advantageous in utility of the perfluorocarbon resins as electrical insulating coating on wire. With this class of insulation, motors and generators can be designed with smaller size per horsepower because of the significantly higher permissible operating temperature.

Although abrasion resistance of the perfluorocarbon resin surface which is associated with the natural lubricity or anti-adhesive character of the surface ordinarily is used to advantage, there are instances where the anti-adhesive characteristic or release activity of the surface presents problems difficult to resolve. In many electrical fabrications it is desirable and more often necessary to have the electrical wire color coded for tracing purposes with identifying indicia and the anti-adhesive characteristic of the perfluorocarbon resin surface ordinarily prevents adequate adhesion of ordinary organic coatings. As a result, the identifying indicia are easily rubbed off during ordinary handling of the color-coded wire and consequently fail to serve their purpose.

Useful marking inks for perfluorocarbon resin surfaces not only need to overcome the anti-adhesion characteristic of that surface, but also need to be characterized by substantially the same degree of chemical and heat resistance as that of the perfluorocarbon resin surface to be serviceable in combination therewith.

Pigmented aqueous dispersion coating compositions containing polytetrafluoroethylene resin as the principal film-forming component have been used as marking ink for polytetrafluoroethylene resin surfaces, but such formulations leave much to be desired in reference to application and performance. An exceedingly high application temperature is required and even at an adequately high temperature the coating speed is necessarily slow to provide ample heating time to promote adhesion to the substrate. Even under most favorable conditions the applied polytetrafluoroethylene resin ink mark ordinarily lacks the desired degree of delineation. A further disadvantage of such prior art polytetrafluoroethylene coatings as marking inks is that they cannot be satisfactorily applied to a perfluorocarbon resin surface having a melt temperature significantly below the melt temperature of the polytetrafluoroethylene. For example, a perfluorocarbon resin surface consisting of interpolymer of hexafluoropropylene and tetrafluoroethylene which is characterized by an advantageously lower melt temperature than polytetrafluoroethylene will melt and flow before a polytetrafluoroethylene coating or ink applied thereon is satisfactorily bonded to the interpolymer surface.

The principal object of the present invention is to provide an ink composition for marking a perfluorocarbon resin surface with an adherent, well-delineated mark which is serviceable in the environment to which the marked surface is ordinarily subjected. A more specific object is to provide an ink composition which overcomes the disadvantages of ordinary polytetrafluoroethylene based inks and which can be applied at practical high coating speeds to insulated wire having an insulating perfluorocarbon surface essentially comprising either polytetrafluoroethylene resin, interpolymer of hexafluoropropylene and tetrafluoroethylene or mixture thereof and which ink applied and cured thereon provides a serviceable, adherent mark. Other objects will be apparent hereinafter as the description of the invention progresses.

In accordance with the present invention, the aforementioned objects are accomplished by combining an aqueous suspensoid of colloidal particles of a perfluorocarbon polymer composition which in 100 parts includes at least 50 parts of an interpolymer of hexafluoropropylene and tetrafluoroethylene, the remainder, up to 50 parts, being polytetrafluoroethylene, with a heat-resistant pigment, a water-dispersible, heat-reactive silicone resin, a water-immiscible volatile liquid organic diluent comprising a solvent for the silicone resin, and a dispersing agent in the presence of an aqueous medium essentially comprising water and an effective small proportion of a suspension stabilizer having the property of imparting increased viscosity to the aqueous phase sufficient to inhibit pigment settling, and uniformly dispersing the perfluorocarbon polymer, the pigment, the silicone resin and the organic diluent in the aqueous medium. The composition of the dispersing agent component is selected to have a hydrophilelipophile balance which favors formation of an oil in water dispersion. The relative proportions of the components are so selected that the perfluorocarbon polymer, pigment, silicone resin and organic diluents are the stably dispersed phases having the aqueous medium as the continuous phase. The ink compositions include the pertinent components in the following proportions:

(a) 100 parts by weight of colloidal particles of the perfluorocarbon polymer composition which includes at least 50 parts of the interpolymer of hexafluoropropylene and tetrafluoroethylene, (b) 3 to 50 parts of the water-dispersible, heat-reactive silicone resin, (c) At least one heat-resistant pigment in an amount sufficient to distinctively color the ink up to 100 parts by weight per 100 parts of (a) plus (b), (d) An effective small proportion up to 10% by weight of the ink composition of a dispersing agent sufficient to stably disperse the water-insoluble components in a continuous aqueous phase, (e) An effective small proportion of suspension stabilizer, ordinarily no more than 5% based on the total ink composition, sufficient to inhibit pigment settling, (f) Water-immiscible volatile liquid organic diluent including a solvent for the silicone resin in an amount at least sufficient to dissolve the silicone resin, and (g) Water in an amount sufficient to provide a fluid product having a continuous aqueous phase, the total content of the water and the organic diluent ordinarily being 50 to 90% of the ink composition and the organic diluent being in the proportion of up to 100 parts by weight per 100 parts of water.

The ink composition preferably further includes (h) a small effective proportion, usually from 0.05 to 2%, of a water-soluble perfluoromonocarboxylic wetting agent having the general formula $C_nF_{2n-1}COOA$ wherein $n$ is an integer from 5 to 9 and A is a monovalent radical of the group of H— and $NH_4$—.

The ink composition is applied to a perfluorocarbon resin surface, e.g. to an insulating surface layer of polytetrafluoroethylene resin, an interpolymer of hexafluoropropylene and tetrafluoroethylene or mixture thereof on wire, either as an identifying mark or stripe or as an entire topcoat. The applied ink is dried, the perfluorocarbon polymer colloidal particles thereof coalesced and the non-volatile residue of the pigment binder of the ink is cured by heating the applied ink at a temperature in the range of 300° to 950° C., preferably 450° to 800° C. The heating temperature is above the gel temperature of the perfluorocarbon resin substrate being coated or marked and the heating period ranges from several minutes at 300° C. to several seconds at 950° C. oven temperature sufficient to accomplish said coalescence, curing and to provide an adherent bond between the cured ink residue and the perfluorocarbon resin substrate. Heating is followed by cooling to below the gel temperature of perfluorocarbon resin substrate and the cured ink residue.

In the accompanying drawing, FIGURE 1 is illustrative of a method of applying the striping inks of this invention to a wire having an insulating layer of perfluorocarbon resin, e.g., polytetrafluoroethylene, interpolymer of hexafluoropropylene and tetrafluoroethylene or a mixture thereof. The method includes essentially an ink application step wherein one or more fluid aqueous dispersion inks, each having a composition as hereinbefore defined, are applied by an ink applicator to the surface of the moving wire. The insulated wire having the surface thereof striped with the indicia ink is then subjected to the essential ink curing step wherein the insulated wire is passed through a high temperature curing oven at a combination of rate and temperature which provides an adherent bond between the perfluorocarbon interpolymer ink and the perfluorocarbon resin substrate. Thereafter, the insulated wire carrying the cured indicia ink on the surface thereof is cooled as it is advanced to windup reel. Inks 1, 2 and 3 are aqueous dispersion ink compositions representative of indicia inks of the invention, each ink being of different color to provide distinguishing marks. The marks designated by the numerals 1, 2 and 3 represent the inks 1, 2, and 3 respectively applied in spaced relationship to each other, e.g., as parallel spiral stripes applied by a spiral applicator.

Figure 2:
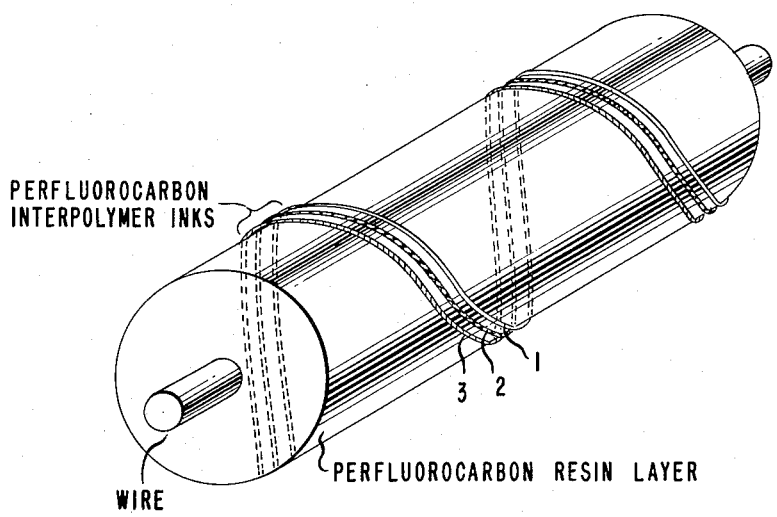

FIGURE 2 is an enlarged perspective view of the wire having the insulating layer of the perfluorocarbon resin marked with indicia inks, the perfluorocarbon resin layer having cured perfluorocarbon interpolymer indicia inks 1, 2 and 3 on the surface thereof in a parallel spiral pattern. As in FIGURE 1, the numerals 1, 2 and 3 designate the applied indicia of the inks 1, 2 and 3 respectively.

The primary film-forming component of the ink composition is the interpolymer of hexafluoropropylene and tetrafluoroethylene. Although this interpolymer is preferred as the perfluorocarbon polymer component, mixtures of 100 parts of the interpolymer with up to 100 parts of polytetrafluoroethylene can be used to advantage in some instances as the perfluorocarbon polymer component, such mixtures preferably having 25 to 65 parts of polytetrafluoroethylene per 100 parts of the interpolymer.

Useful interpolymers of hexafluoropropylene and tetrafluoroethylene are characterized by a crystalline melting point in the range of 242 to 305° C., preferably in the range of 256 to 287° C. Ordinarily, these useful interpolymers are further characterized by a melt viscosity in the range of 1500 poises to $3 \times 10^5$ poises when measured at 380° C. under a shear stress of 6.5 pounds per square inch. These useful perfluorocarbon interpolymers as defined can be obtained by polymerizing a monomer mixture which in 100 parts by weight contains from 30 to 90 parts of hexafluoropropylene and correspondingly 70 to 10 parts of tetrafluoroethylene in the presence of a water solution of a free radical-generating inorganic polymerization catalyst at 90°–100° C. under a pressure of 30 to 50 atmospheres during a period of up to 180 minutes, ordinarily from 60 to 120 minutes. Although interpolymer coagulated from the aqueous polymerization medium, dried and pulverized to small particle size of up to 5 microns dimension can be used, the interpolymer is preferably prepared as an aqueous suspensoid without the coagulation and separation steps, using a small effective proportion of a soluble dispersing agent to stabilize the suspensoid of colloidal particles. The alkali metal salts of the sulfuric acid half esters with a higher fatty alcohol, e.g. sodium lauryl sulfate, in the proportion of up to 10 parts per 100 parts by weight of the interpolymer are useful dispersants. Non-ionic dispersants of the class of ethers of polyethanoxy ethanols are also useful either in place of or in combination with the aforementioned half ester sulfate salts in the interpolymer suspensoid.

The concentration of the interpolymer in the aqueous polymerization product is relatively low, rarely exceeding about 18% interpolymer content. More practical concentrations are obtained by electro-decantation of these interpolymer suspensoids to a concentration in the range of 25 to 60% or by thermal phase separation in the presence of high concentrations of suitable non-ionic dispersants.

An aqueous suspensoid of an interpolymer having from 20–15% of interpolymerized hexafluoropropylene and 80–85% interpolymerized tetrafluoroethylene and containing from 1 to 5 parts of sodium lauryl sulfate per 100 parts of the colloidal particles of the interpolymer is particularly preferred as the interpolymer suspensoid in practicing this invention.

The second essential film-forming component of the ink composition is the water-dispersible, heat-reactive silicone resin. "Water-dispersible" as used herein refers to resins which form stable dispersions or emulsions in water, either per se or as solutions in water-immiscible liquid organic solvents. "Heat-reactive" refers to silicone resins which when applied as a thin coating to a heat-resistant substrate and heated, for example, at a temperature in the range of 100° C. to 300° C. form smooth continuous coatings which are substantially insoluble in solvents for the uncured starting silicone resin. Preferred heat-reactive silicone resins adaquately cure to a tack free state on heating for a period of one hour at a temperature in the range of 100° to 250° C. These silicone resins are poly(organosiloxanes) containing the recurring structural unit:

wherein R and R' represent hydrocarbon radicals. Polysiloxane resins in which R— and R'— represent alkyl and aryl radicals, respectively, are preferred. Particularly preferred silicone resins have methyl as the alkyl radical and phenyl as the aryl radical in the ratio of from 0.5 to 2 of the methyl radical per phenyl radical and have from 1 to 2 of these hydrocarbon radicals per silicon atom. Water-dispersible, heat-reactive silicone resins of the defined useful type and the process of their preparation are described, for example, in U.S. Patent No. 2,258,222. Readily commercially available silicone resins of the type used in this invention are those supplied by the Dow Corning Corporation under the designations DC–801, DC–803, DC–805, DC–806, DC–840; those supplied by the General Electric Company under the designations SR–82, SR–112, SR–02, SF–69 and 81727; and those supplied by Union Carbide Corporation under the designations R–62 and R–64.

The useful proportion of the heat-reactive silicone resin can range from 3 to 50 parts per 100 parts by weight of the perfluorocarbon polymer. At a proportion less than 3 parts of the silicone resin, the contribution of the silicone resin to the film-forming vehicle is insignificant. At proportions greater than 50 parts of the silicone resin, the advantageous contributions of the perfluorocarbon polymer to the film-forming vehicle are impaired, particularly in reference to toughness and abrasion resistance. The preferred proportion of the heat-reactive silicone resin is 5 to 25 parts per 100 parts of the perfluorocarbon polymer.

The pigment component of the ink composition can comprise any heat-resistant pigment or mixture of pigments which is stable on exposure to the temperature conditions of drying and curing the applied ink. Typical examples of useful pigments are the inorganic metal oxides, metal sulfides, phthalocyanines, chromates, ultramarine blue, lamp black and carbon black. The following are typical useful pigments which are commercially available.

| Pigment | Source |
| --- | --- |
| National Blue #10034 | B. F. Drakenfield, New York, N.Y. |
| Green F–9653 | Ferro Corporation, Cleveland, Ohio. |
| Orange F–5895 | Do. |
| Red F–5893 | Do. |
| Black F–2302 | Do. |
| Chrome Yellow-Med. Y–661–DR | E. I. du Pont de Nemours & Co., Inc., Wilm. Del. |
| "Ti-Pure" 510 Titanium Dioxide | Do. |
| "Monastral" Fast Blue BFP | Do. |
| "Lithosol" Fast Yellow 36D | Do. |
| "Lithosol" RMM | Do. |
| "Lithosol" 4RNL | Do. |
| Yellow J–172 | Do. |
| Cadmium Red-Dark #112–6 | Harshaw Chemical Co., Cleveland, Ohio. |
| Cadmium Red-Med.-Light #90–6 | Do. |
| Ultramarine Blue UB–6130 | Std. Ultramarine Co. |

Intermediate colors and shades can be obtained by blending the respective single pigment inks, by using mixtures of pigmented hydrophobic bases or by using pigment mixtures in a composite pigmented base.

The proportion of heat-resistant pigment can range up to 100 parts by weight per 100 parts total of the perfluorocarbon polymer and heat-reactive polysiloxane resin. The proportion of pigment is sufficient to provide a color-contrasting mark when the link is applied in a single coat of ordinary thickness to the perfluorocarbon resin substrate. Preferably the proportion of the pigment is from 20 to 60 parts by weight on the above indicated basis.

The order in which the pigment and film-forming vehicle are combined in preparing the aqueous dispersion ink composition is not critical. Preferably the pigment is initially dilspersed in a hydrophobic vehicle containing at least part of the silicone resin, at least part of the organic diluent comprising a solvent for the silicone resin and a dispersing agent which preferably is oil-soluble. The resulting hydrophobic pigment dispersion is combined with the aqueous suspensoid of the perfluorocarbon polymer in the presence of the aqueous medium containing the suspension stabilizer. The perfluorocarbon polymer suspensoid having the polymer colloidally suspended in a continuous aqueous phase and being water-dilutable can be added either before or after the hydrophobic pigment portion is added to the aqueous suspending medium.

When the total content of silicone resin and the organic diluent is significantly greater than that ordinarily needed to provide fluidity for dispersing the pigment as the hydrophobic portion, the excess silicone resin and excess organic diluent can be separately added to the composition and dispersed therein. In some instances it is desirable to reserve a portion of the organic diluent as a final addition to permit adjustment in the viscosity of the ink composition.

The pigment in some instances can be satisfactorily dispersed directly in the aqueous medium containing the suspension stabilizer with the aid of the dispersing agent or in the aqueous suspensoid of perfluorocarbon polymer with the solution of the silicone resin in the orgnaic diluent being emulsified into the pigmented aqueous portion.

The pigment can be dispersed by any ordinary technique used in dispersing pigments in coating compositions such as for example by pebble or ball mill grinding, sand grinding, grinding with glass beads, paste mixing, and roller milling.

A state of very fine sub-division, i.e. small particle size, in the aqueous dispersion is pertinent to achieving well-delinated uniform indicia on the perfluorocarbon resin substrate. A particle size no greater than 5 microns is preferred for the dispersed pigment and the colloidal particles of the perfluorocarbon polymer component.

The organic diluent can be any single volatile liquid organic compound or a mixture of such compounds which is a solvent for the silicone resin and is water-immiscible to permit the dispersion thereof as a separate phase in the aqueous ink composition. Preferred organic diluents have a boiling range within the temperature limits of 80° to 200° C. Hydrocarbons are preferred diluents, and the aromatic hydrocarbons, e.g. toluol and xylol, and high solvency petroleum naphthas having a high aromatic content are especially preferred. Water-immiscible esters, ketones and alcohols can be included in the volatile diluent if desired. Small proportions of water-soluble organic diluents such as, for example, acetone, alcohols, and glycol ethers can be present in combination with the water-immiscible volatile liquid organic components provided the proportion is insufficient to render the diluent mixture water-miscible, insufficient to cause phase reversal whereby the aqueous phase is the dispersed phase and the organic diluent forms the continuous phase, and insufficient to cause coagulation of the colloidal particles of perfluorocarbon polymer.

The proportion of the volatile liquid organic diluent can range widely provided the organic diluent is the dispersed phase and the aqueous phase is the continuous phase. Preferably the volatile liquid organic diluent is at a proportion no greater than 100 parts by weight per 100 parts of water.

The ink composition can be formulated with a wide range of non-volatile or ink solids content such as for example from 5 to 60% by weight. Preferably, practical ink formulations of this invention have a volatile content, i.e. water plus volatile liquid organic diluent, in the range of 50 to 90% by weight.

The dispersing agent of the aqueous ink composition is essential for stably dispersing the perfluorocarbon polymer as a suspensoid, the silicone resin, the pigment and the water-immiscible liquid organic diluent in the aqueous continuous phase. The dispersing agent can be a single species or a plurality of species. The aqueous suspensoid of the perfluorocarbon polymer and the pigmented hydrophobic portion usually being separately prepared and then combined ordinarily necessitates separate additions of the dispersing agent. The dispersing agent used for forming the suspensoid of the perfluorocarbon interpolymer may be the same or different from that used in dispersing the pigment and in each instance the dispersing agent can be a single species or a mixture of species. In preparing the perfluorocarbon polymer suspensoid, the dispersing agent is usually water-soluble and anionic. The alkali metal salts of the acidic half ester of sulfuric acid and a $C_8$ to $C_{20}$ fatty alcohol, e.g. sodium lauryl sulfate, are ordinarily used. Non-ionic dispersing agents of the alkylphenoxy polyethanoxyethanol class having a 7 to 10 carbon atom alkyl substituent and from 5 to 15 combined units of ethylene oxide in the polyethanoxy portion can be satisfactorily substituted wholly or in part for the fatty sulfate half ester salt. The portion of the total dispersing agent used to separately disperse the pigment in the hydrophobic liquid organic medium preferably is non-ionic, the above described alkylphenoxypolyethanoxyethanols being preferred. Of these, the octyl- and nonylphenoxypolyethanoxyethanols having an average content of 8 to 10 condensed ethylene oxide units per molecule are especially preferred. Another useful class of non-ionic dispersing agents are the polyethanoxy ethers of higher fatty alcohols, such as the lauryl alcohol ether, having a hydrophile-lipophile balance which favors the formation of oil in water dispersions. Brij 30 and Brij 35 supplied commercially by the Atlas Powder Co., Wilmington, Del., are representative of this latter fatty alcohol ether class. The described class of alkylphenoxypolyethanoxyethanols are supplied commercially by Rohm and Haas, Philadelphia, Pa., under the trademark "Triton," Triton X–100 being particularly useful.

The total concentration of the dispersing agent in the ink composition can satisfactorily range from 1 to 10% based on the ink composition, preferably 2 to 8% total dispersing agent selected from the above described dispersing agents or mixtures thereof. Especially preferred ink compositions have as the dispersing agent component a mixture which provides 0.3 to 5% of sodium or potassium lauryl sulfate and 0.5 to 9.7% of the described octyl- or nonyl phenoxy polyethanoxyethanol for a total content of up to 10%.

For the purpose of maintaining the dispersed pigment and the colloidal particles of the perfluorocarbon interpolymer in stable suspension under diverse conditions of application, the aqueous dispersion ink composition further includes a suspension stabilizer which either in aqueous solution or in aqueous dispersion is significantly viscous and provides the ink with body to effectively inhibit pigment settling. Water-soluble cellulose derivatives, such as, for example, methyl cellulose and carboxymethyl cellulose, polyvinyl alcohol, polyacrylic acid, polymethacrylic acid, aqueous polyisobutylene dispersion and ammonium alginate are typical useful organic suspension stabilizers. Water-swellable montmorillonite clays and dimethyldioctadecylammonium bentonite are typical useful inorganic suspending agents. Adequately high molecular weight species of the organic suspending agents are preferably selected in order that a relatively small concentration of the agent is required to perform its function. The organic species of suspension stabilizers are combustible or heat-fugitive under the temperature conditions of curing the applied ink and it is desirable to minimize the concentration in order that the residual ash is insignificant. Ordinarily at least 0.1% of the viscous suspending agent is required to provide a practical effect and preferably the concentration does not exceed 5% of the total composition. Methyl cellulose at a concentration in the range of 0.1 to 2% is particularly preferred.

The viscous aqueous solution of water-soluble suspension stabilizer or aqueous dispersion thereof preferably is separately prepared and then used as the continuous aqueous phase into which the pigment, silicone resin, water-immiscible diluent and the suspensoid of the perfluorocarbon polymer are combined in appropriate proportions and uniformly dispersed therein.

For the purpose of adequately wetting the perfluorocarbon resin substrate with the invention aqueous dispersion ink composition, the ink further includes the aforementioned effective small proportion of water-soluble perfluoro wetting agent. Particularly useful for this purpose is ammonium perfluorocaprylate. This wetting agent is commercially available from Minnesota Mining and Mfg. Co., St., Paul, Minn., under the designation F–126. Perfluoromonocarboxylic acids of the general formula $C_nF_{2n-1}COOH$ where $n$ is from 5 to 9 and ammonium salts thereof can be substituted wholly or in part for the ammonium perfluorocaprylate. The proportion of the perfluorocarboxylic wetting agent can range up to 2% based on the weight of the aqueous ink composition. About 0.05% is required to show a practical improvement in wetting and concentrations significantly in excess of 2% exhibit no practical advantage over the 2%. The preferred concentration of the perfluorocarboxylic wetting agent is in the range of 0.3 to 1.0%. The wetting agent, being water-soluble, can be added to the composition at any stage or to any of the aqueous components, but preferably it is included in the continuous aqueous phase containing the suspension stabilizer into which the pigment and film-forming components are to be dispersed.

Various optional additives can be included in the ink compositions in minor proportions. One useful group of ancillary components are the water-dilutable, heat-reactive formaldehyde condensation resins such as formed by condensation of formaldehyde with phenols, urea, melamine or urea/melamine mixtures. "Water-dilutable" as used herein refers to formaldehyde condensation resins which are soluble in water or to liquid resins or finely ground solid resins which can be colloidally dispersed in water. Condensates of this class and their uses in combination with aqueous suspensoids of polytetrafluoroethylene are described in Sanders U.S. Patent No. 2,825,706.

Another class of ancillary resinous materials which can be added to the ink compositions are the aqueous dispersions of the water-insoluble interpolymers of 30–80% acrylonitrile, 15–65% of an ester of acrylic or methacrylic acid and a lower alkanol, and 2–15% of methacrylic or acrylic acid prepared as described in Sanders U.S. Patents 2,787,561; 2,787,603; and 2,866,763; and Maeder U.S. Patent 2,753,318.

The proportion of these optional resinous modifiers, when present, ordinarily does not exceed 15 parts by weight per 100 parts of film-forming components.

The aqueous dispersion ink composition can be applied by any of the conventional means of ink application such as by brush, stamp, roller and spray to the perfluorocarbon resin surface to be marked or coated. The invention inks are particularly useful for applying spiral striping to a wire having an insulating surface layer of perfluorocarbon resin. The Entwistle spiral marking machine, manufactured by the J. L. Entwistle Co. of Cranston, R.I., is effective for such wire striping at speeds ordinarily ranging up to 100 feet per minute with concurrent application of a plurality of stripes. In this striping device, the liquid ink is subjected to a centrifugal force which ordinarily accelerates settling of the dispersed particles in the ink. The ink compositions of this invention are formulated to retard settling in the Entwistle application process.

Ordinarily the perfluorocarbon resin surface to be marked does not require any special pretreatment prior to printing or striping the ink thereon. However, for optimum results in terms of uniformity and precise delineation, the surface can be uniformly slightly abraded by subjecting it to the abrasive action of fine particle size quartz particles, e.g. 140 mesh size, in a water jet. The "Liquamatte" machine machine manufactured by the American Wheelabrator and Equipment Corp. of Mishawaka, Ind., is suitable for this abrading operation. This slight abrading of the surface advantageously reduces the contact angle of the ink with the surface.

Drying and curing or fixing of the ink is accomplished by heating the applied ink at a temperature from 300° to 950° C., preferably in the range of 450° to 800° C. for a period sufficient to coalesce the colloidal particles of the perfluorocarbon polymer and bind the non-volatile residue of the ink to the perfluorocarbon resin surface.

The heating period ordinarily ranges from several seconds at 950° C. to several minutes at 300° C. The optimum temperature and heating period are interdependent and will vary with the gel temperature of the perfluorocarbon resin surface to be marked which ordinarily ranges from 270 to 327° C., polytetrafluoroethylene having a gel temperature of 327° C. and the gel temperature of the interpolymers of hexafluoropropylene and tetrafluoroethylene being as low as 270° C. The following table shows the preferred heating periods for the respective oven temperatures.

TABLE I

| Temperature: | | Time |
|---|---|---|
| 950° C | seconds | 2.5–5.5 |
| 800° C | do | 5–10 |
| 450° C | do | 12–32 |
| 350° C | do | 25–75 |
| 300° C | minutes | 1–5 |

At oven temperatures below 450° C., the heating period is less critical and heating period may be extended to as long as 15 minutes at 300° C. without significant adverse effect on the marked product.

In wire striping, the operating speed of the striping machine and the drying oven facilities are controlling factors in the time-temperature relationship in practical operations. Drying or baking ovens for coating wire preferably are vertical and ordinarily are limited to a height of 30 feet on an economical and practical basis. Thus at a coating speed of 75 feet per minute, exposure to the oven temperature in a 30 foot oven is 24 seconds. This heating period requires operating at an oven temperature of about 450–500° C. for best results. Ordinarily the baking oven is of shorter length, such as for example 10 to 20 feet, and as a coating speed of 75 feet per minute, the heating period is 12 seconds in an average 15 foot oven. Thus, with this heating period, it is desirable to operate at a temperature in the range of about 500 to 700° C. Higher coating speeds, i.e. shorter exposure to the oven temperature, are permissible at the higher temperatures. For example, a coating speed of at least 100 feet per minute can be achieved at 750° C. oven temperature and still higher speeds at higher temperatures up to 950° C.

The invention is more particularly described and explained by the following illustrative examples. In the described ink compositions, the indicated parts and percentages of the respective components are on a weight basis unless otherwise designated.

Example I

BLUE STRIPING INK

| First portion: | Parts by wt. |
|---|---|
| Aqueous 2% methyl cellulose solution | 150 |
| Deionized or distilled water | 56 |
| Dispersing agent, octylphenoxy polyethanoxyethanol, "Triton" X-100 | 3 |
| Aqueous solution of perfluoro-wetting agent, 30% ammonium perfluorocaprylate | 12 |
| Aqueous suspensoid of tetrafluoroethylene/hexafluoropropylene interpolymer, 50% interpolymer concentration and containing sodium lauryl sulfate dispersing agent | 300 |

| Second portion: | |
|---|---|
| Toluol | 184 |
| Dispersing agent, octylphenoxypolyethanoxyethanol | 15 |
| Ultramarine pigment dispersion base | 150 |
|   Ultramarine blue pigment, UB-6130 | 45.0 |
|   50% silicone resin in xylol, Dow Corning DC-803 | 22.5 |
|   Octylphenoxy polyethanoxyethanol | 4.5 |
|   Toluol | 78.0 |
| | 150.0 |
| Titanium dioxide pigment dispersion base | 30 |
|   Titanium dioxide pigment | 15.0 |
|   50% silicone resin in xylol, DC-803 | 1.1 |
|   Octylphenoxypolyethanoxyethanol | 1.1 |
|   Toluol | 12.8 |
| | 30.0 |
| | 900 |

This composition contains 60 parts of pigment per 150 parts of perfluorocarbon polymer and 11.8 parts of silicone resin.

Example II

RED INK MATCHING MILITARY STANDARD, 104 RED

| First portion: | Parts by wt. |
|---|---|
| Aqueous 2% methyl cellulose solution | 110 |
| Wetting agent, 30% ammonium perfluorocaprylate in water | 8 |
| Deionized or distilled water | 42 |
| Octylphenoxypolyethanoxyethanol, "Triton" X-100 | 20 |
| Aqueous Suspensoid of perfluorocarbon interpolymer, 47.4% polymer content and sodium lauryl sulfate | 170 |

| Second portion: | |
|---|---|
| Cadmium red pigment dispersion | 100 |
|   Cadmium Red Dark #112-6 | 27.6 |
|   Cadmium Red Medium Light #90-6 | 27.6 |
|   50% silicone resin in xylol, DC-803 | 10.3 |
|   Octylphenoxypolyethanoxyethanol, "Triton" X-100 | 5.4 |
|   Toluol | 29.1 |
| | 100.0 |

| Third portion: | |
|---|---|
| Aqueous 40% silicone resin dispersion | 25 |
|   60% silicone resin in xylol, DC-801 | 8.3 |
|   50% silicone resin in xylol, DC-803 | 10.0 |
|   Sodium lauryl sulfate | .6 |
|   Water | 6.1 |
| | 25.0 |

| Fourth portion: | |
|---|---|
| Toluol | 130 |
| | 605 |

This composition contains 55.2 parts of pigment per 80.6 parts of perfluorocarbon polymer and 15.2 parts of silicone resin.

Example III

YELLOW STRIPING INK

| First portion: | Parts by wt. |
|---|---|
| Aqueous 2% methyl cellulose solution | 110 |
| Wetting agent, 30% ammonium perfluorocaprylate in water | 8 |
| Deionized or distilled water | 42 |
| Octylphenoxy polyethanoxyethanol, "Triton" X-100 | 20 |
| Aqueous suspensoid of tetrafluoroethylene and hexafluoropropylene interpolymer, 47.4% polymer content and sodium lauryl sulfate | 170 |

| Second portion: | |
|---|---|
| Yellow pigment dispersion base | 94 |
|   Yellow pigment, J-172 | 60.0 |
|   Talc extender, "Surfex" | 4.5 |
|   Toluol | 16.2 |
|   Octylphenoxy polyethanoxyethanol | 4.5 |
|   50% silicone resin solution in xylol, DC-803 | 8.8 |
| | 94.0 |

| Third portion: | |
|---|---|
| Aqueous silicone resin dispersion, same as in Example II | 26.5 |

| Fourth portion: | |
|---|---|
| Toluol | 154.5 |
| | 625 |

This composition contains 64.5 parts of pigment per 80.6 parts of the perfluorocarbon polymer and 15 parts of the silicone resin.

Example IV

BLACK STRIPING INK

| First portion: | Parts by wt. |
|---|---|
| Aqueous 2% methyl cellulose solution | 110 |
| Wetting agent, 30% ammonium perfluorocaprylate in water | 8 |
| Deionized or distilled water | 42 |
| Octylphenoxypolyethanoxyethanol, "Triton" X-100 | 20 |
| Aqueous suspensoid of polytetrafluoroethylene, 60% polymer and 1.5% sodium lauryl sulfate | 50 |
| Aqueous suspensoid of hexafluoropropylene and tetrafluoroethylene interpolymer, 47.4% interpolymer and sodium lauryl sulfate | 110 |

| Second portion: | |
|---|---|
| Lamp black tinting base | 51 |
|   Lamp black | 3.1 |
|   Calcium carbonate extender | 14.8 |
|   Aluminum silicate extender | 12.2 |
|   Dehydrated castor oil | 5.1 |
|   Dispersing agent, "Triton" X-100 | 5.6 |
|   Soya lecithin | 1.5 |
|   High solvency petroleum naphtha | 8.7 |
| | 51.0 |
| Ultramarine blue base | 38 |
|   Ultramarine pigment, UB-6130 | 15.2 |
|   50% silicone resin solution in xylol, DC-803 | 7.6 |
|   Toluol | 12.5 |
|   Dispersing agent, "Triton" X-100 | 2.7 |
| | 38.0 |

| Third portion: | |
|---|---|
| Aqueous 40% silicone resin dispersion | 28 |
|   Water | 6.8 |
|   Sodium lauryl sulfate | .7 |
|   60% silicone resin solution in xylol, DC-801 | 9.3 |
|   50% silicone resin solution in xylol, DC-803 | 11.2 |
| | 28.0 |

| Fourth portion: | |
|---|---|
| Toluol | 123 |
| | 580 |

This composition contains 45.3 parts of pigment per 82.1 parts of perfluorocarbon polymers and 15 parts of silicone resin.

*Example V*

CHROME YELLOW STRIPING INK

| First portion: | Parts by wt. |
|---|---|
| Water, distilled or deionized | 100 |
| Perfluoromonocarboxylic wetting agent, 30% in water (same as used in Example I) | 8 |
| Octylphenoxypolyethanoxyethanol, "Triton" X-100 | 8 |
| Second portion: | |
| Aqueous chrome yellow pigment dispersion | 120 |
|   Chrome yellow pigment, Y-433D___ 54.0 | |
|   Water ___ 65.4 | |
|   Dispersing agent, "Tamol" N___ 0.6 | |
|                       120.0 | |
| Third portion: | |
| Toluol | 210 |
| Fourth portion: | |
| Aqueous silicone resin dispersion, 40% resin (same as used in Example IV) | 29 |
| Fifth portion: | |
| Suspension stabilizer, aqueous 55% polyisobutylene dispersion | 50 |
| Sixth portion: | |
| Aqueous suspensoid of hexafluoropropylene-tetrafluoroethylene interpolymer, 51.4% polymer content and sodium lauryl sulfate | 175 |
| | 700 |

This composition contains 54 parts of pigment per 90 parts of perfluorocarbon polymer and 11.6 parts of silicone resin.

*Example VI*

ORANGE STRIPING INK

A suitable orange colored ink was obtained by uniformly mixing 100 parts of the Example V yellow ink composition with 20 parts of the Example II red ink composition.

Alternatively an equivalent orange ink composition can be obtained by substituting 21 parts by weight of the cadmium red pigments the same as used in Example II for an equal weight of chrome yellow in Example V, the cadmium red pigment being dispersed either as a composite with the chrome yellow, separately as an aqueous dispersion, or separately as a hydrophobic dispersion including the silicone resin, the organic solvent therefor, and dispersing agent.

The particular grade of perfluorocarbon interpolymer used in the examples is "Teflon" FEP fluorocarbon resin suspensoid available from E. I. du Pont de Nemours and Co., Inc. The interpolymer content of this aqueous suspensoid ordinarily is in the range of about 12 to 18% and is stabilized with about 2.5 parts of sodium lauryl sulfate as the dispersing agent per 100 parts of the interpolymer. The average particle-size of the colloidal particles of the perfluorocarbon interpolymer ordinarily is less than 0.5 micron. The interpolymer per se is analytically characterized as being 20 to 15% of interpolymerized hexafluoropropylene and 80 to 85% interpolymerized tetrafluoroethylene. For use in the specific examples, this available suspensoid was concentrated to a more practical interpolymer content in the range of 45 to 55% by electrodecantation using an applied D.C. voltage of about 220 to 250 volts at 6 to 8 amperes with the current reversed at about 1 to 1.5 minute intervals. Although the dispersing agent is water-soluble, only a small fraction is lost with the water in this decantation operation and the resulting concentrate usually retains at least 2 parts of the original 2.5 parts of the sodium lauryl sulfate per 100 parts of the interpolymer.

Alternatively, available "Teflon" FEP fluorocarbon resin suspensoid thermally concentrated to 50 to 60% interpolymer content and having about 6 parts of "Triton" X-100 dispersant can be used in place of the sodium lauryl sulfate stabilized suspensoid specified in the examples.

The indicated water-dispersible heat-reactive silicone resins are specifically identified as follows: Dow-Corning's silicone resin DC-801 which is commercially supplied as a 60% solution of the silicone resin in xylol having a specific gravity of 1.04 to 1.06 and a solution viscosity of 100 to 300 centipoises at 25° C., the silicone resin being further characterized as curing to a tack-free film on heating at 250° C. for a period of 1 hour maximum. Dow-Corning's silicone resin DC-803 which is commercially supplied as a 50% solution of the silicone resin in xylol having a specific gravity of 1.02 to 1.04 and a solution viscosity of 100 to 200 centipoises at 25° C., the silicone resin being further characterized as curing to a tack-free film on heating at 100° C. for a period of 1 hour maximum. Blends of the two silicone resins provide a wide range in heat-reactivity.

The examples show the use of the silicone resins in solution in water-immiscible volatile liquid organic diluent including the solvent for the silicone resin and as separately prepared aqueous dispersions of the silicone resin solutions. As indicated in Example II, these resin solutions can be conveniently predispersed in water containing a water-soluble dispersing agent, e.g. sodium lauryl sulfate, in an amount usually ranging up to 5% based on the silicone resin.

The oil-soluble dispersing agent octylphenoxypolyethanoxyethanol, commercially available as "Triton" X-100, is further characterized by having an average of 8 to 10 condensed units of ethylene oxide in the polyethanoxyethanol portion thereof. The corresponding nonylphenoxy ether substituted wholly or in part for the octylphenoxy ether dispersing agent provides comparable dispersion products. Similar quality products are obtained when the lauryl alcohol ether of polyethanoxyethanol, Brij-15, is substituted in part or wholly for the octylphenoxy ether dispersing agent.

Ancillary dispersing agents can be present to supplement the polyethanoxyethanol ethers and the alkali metal salts of the sulfuric acid half esters of higher fatty alcohols. These are ordinarily introduced as a matter of convenience through the use of available preformed aqueous dispersions of pigment and suspending agents which usually provide less than 5 parts in 100 parts total content of dispersing agent of the ink composition. Example V is particularly illustrative of the introduction of ancillary dispersing agents wherein "Tamol" N, which is a sodium salt of naphthalenesulfonic acid/formaldehyde condensate having an average of two to three of the naphthalene groups per molecule, is used as a dispersant for the pigment in aqueous medium.

The composition of this example ink further includes a small proportion of an ammonium soap and ammonium caseinate present as dispersants for the polyisobutylene suspension stabilizer commercially supplied by Miller and Stephenson Chemical Co. as polyisobutylene dispersion 108 containing 55% of dispersed "Vistanex" No. 6 polyisobutylene in water.

A further source of ancillary dispersing agents is purchased dispersed pigment concentrates of the type which are easily mixed with either aqueous or non-aqueous paints and other coating compositions for tinting purposes. The dispersing agent component of these commercial pigment concentrates usually comprises an alkyl polyoxyalkylenethanol or alkylphenoxypolyoxyalkylene ethanol having a $C_4$–$C_{10}$ hydrocarbon as the alkyl group and from 8 to 50 units of condensed ethylene oxide or propylene oxide as the principal component as described in Willis and Gehring U.S. Patent 2,809,122. The pigment concentrate can also include minor proportions of still other ancillary dispersants, e.g. sorbitan monooleate etherified with a plurality of ethylene oxide units.

In preparing the example ink compositions, the components of the respective first portions were combined in the order indicated and mixed until uniform, then the respective second portions were added to the respective first portions and mixed to uniformly distribute the pigment in the combined portions. The respective additional portions were added to the combined first and second portions in the indicated order and mixed until the ink components were uniformly distributed in the composition having a continuous aqueous phase. Mixing of the combined portions was with moderate agitation to avoid coagulation of the perfluorocarbon polymer. Mixing of the respective portions or combined portions which do not include the suspensoid of the perfluorocarbon interpolymer can be mixed at ordinary speeds ranging up to several thousand r.p.m. for the impeller in mixing means capable of handling the particular fluid portions.

The several ink compositions as represented by the foregoing examples were charged into the Entwistle Spiral Marking Machine and applied singly, in concurrently applied color pairs and in concurrently applied color triplets to 7 strand AWG–22 hook-up wire having about 10 mils of insulating perfluorocarbon resin surface layer which in one instance was polytetrafluoroethylene resin and in the second instance was a resinous interpolymer of hexafluoropropylene and tetrafluoroethylene. The striping ink was applied in one coat at coating speeds ranging from 40 to 80 feet per minute. The applied inks were coalesced and cured by passing the wire through a vertical 2″ tubular oven ten feet long maintained at a temperature of 720° to 760° C. for the inks applied to the polytetrafluoroethylene surfaced wire and at 630° to 660° C. for the inks applied to perfluorocarbon interpolymer resin surfaced wire, followed by cooling to below the gel temperature and eventually to room temperature.

The cured inks were found to provide uniform, sharply-delineated color stripes which were strongly bonded to the respective perfluorocarbon resin surfaces. The abrasion resistance of the cured ink on the perfluorocarbon resin surface was measured by the recognized General Electric scrape abrasion tester technique which involves dragging a 0.016 inch diameter needle under a specific load back and forth in a horizontal plane at a 90° angle in reference to the wire length with the cylindrical surface of the needle in contact with the test surface. Under a 500 gram load, the scrape abrasion resistance ranged from 200 to 700 strokes, ordinarily at least 250 strokes, to remove the stripe by abrasion.

Comparative aqueous suspensoid ink compositions based on colloidal particles of polytetrafluoroethylene resin as the film-forming vehicle and being representative of inks in commercial use for marking polytetrafluoroethylene surfaces were applied to hexafluoropropylene/tetrafluoroethylene interpolymer surfaced wire and cured at 630° to 660° C. at 40 to 80 feet per minute coating speed. The residual ink was inadequately coalesced and set at this temperature and readily flaked from the marked substrate when the insulated wire was flexed. When the curing temperature was raised to 760° C. suitable for marking a polytetrafluoroethylene surface, the polytetrafluoroethylene-based ink was adequately coalesced and anchored to the perfluorocarbon interpolymer surface, but on exposure to this high temperature which is significantly above the gel temperature of the interpolymer, the interpolymer substrate exhibited plastic flow with the result that the substrate became deformed.

A comparison between the indicia of the invention inks applied and cured on either polytetrafluoroethylene resin or hexafluoropropylene/tetrafluoroethylene interpolymer surfaces and indicia of polytetrafluoroethylene resin ink applied and cured on polytetrafluoroethylene resin surfaces showed better delineation of the mark with the invention inks. A further advantage noted is that the invention inks could be coated at higher coating speeds at a suitable curing temperature in comparison with the speed necessary to adequately coalesce and bind the polytetrafluoroethylene resin based ink to the polytetrafluoroethylene resin surface.

In addition to the clear delineation of marks or stripes applied from the invention inks, these indicia were uniform in color density which is indicatve that the fluid inks adequately resist settling while subjected to the centrifugal forces peculiar to the Entwistle application process.

Although the invention inks are particularly useful as striping inks for perfluorocarbon resin insulated wire, they are also useful for applying indicia on other formed perfluorocarbon resin surfaces or as a topcoat finish over a perfluorocarbon resin undercoat.

While the above examples and disclosures represent only a few specific embodiments of the invention, it will be apparent that many widely different embodiments thereof can be made without departing from the spirit and scope of the invention and, therefore the invention is intended not to be limited except as indicated in the appended claims.

I claim:

1. An aqueous dispersion ink composition for marking a perfluorocarbon resin surface comprising (a) 100 parts of dispersed colloidal particles of a perfluorocarbon polymer composition which includes at least 50 parts of an interpolymer of hexafluoropropylene tetrafluoroethylene, the remainder, 0 to 50 parts, being polytetrafluoroethylene, (b) up to 50 parts of a water-dispersible, heat-reactive silicone resin, (c) up to 100 parts of at least one heat-resistant pigment per 100 parts of (a) plus (b), (d) an effective small proportion of at least one dispersing agent sufficient to stably disperse said components (a), (b) and (c) in an aqueous medium as the continuous phase including (e) an effective small proportion of a suspension stabilizer having the property of imparting increased viscosity to the aqueous phase sufficient to inhibit pigment settling, (f) a water-immiscible volatile liquid organic diluent including a solvent for said silicone resin, and (g) water in an amount sufficient to provide a fluid product having a continuous aqueous phase.

2. The ink composition of claim 1 wherein said continuous aqueous phase further includes (h) an effective small proportion up to about 2% of the total composition of a water-soluble perfluoromonocarboxylic wetting having the general formula $C_nF_{2n-1}COOA$ wherein $n$ is an integer from 5 to 9 and A is of the group of H— and $NH_4$—.

3. The ink composition of claim 1 essentially comprising (a) 100 parts of said perfluorocarbon interpolymer which is the polymerization product of a perfluorocarbon monomer mixture having a hexafluoropropylene:tetrafluoroethylene weight ratio ranging from 30:70 up to 90:10, (b) 5 to 25 parts of said heat-reactive silicone resin, (c) 20 to 60 parts of said heat-resistant pigment, (d) 1 to 10% of said dispersing agent, (e) 0.1 to 2% of water-soluble methyl cellulose as said suspension stabilizer, (f) said water-immiscible organic diluent comprising an aromatic hydrocarbon solvent and having a boiling range between 80° and 200° C., and being present in an amount up to 100 parts by weight per 100 parts of water, the total content of said organic diluent and the water being from 50 to 90% by weight of the composition.

4. The ink composition of claim 3 wherein said dispersing agent (d) is a mixed composition which present up to 10% of the ink composition includes 0.3 to 5% of a water-soluble alkali metal salt of the sulfuric acid half ester of a higher fatty alcohol and from 0.5 to 9.7% of an oil-soluble non-ionic ether derivative of a polyethanoxyethanol.

5. The ink composition of claim 4 wherein said nonionic component of said dispersing agent (d) is octylphenoxypolyethanoxyethanol having an average of 8 to 10 condensed units of ethylene oxide in the polyethanoxyethanol portion.

6. The ink composition of claim 3 wherein said perfluorocarbon interpolymer is further characterized by a crystalline melting point in the rangeo f 242 to 305° C. and a melt viscosity of $1.5 \times 10^3$ to $3 \times 10^5$ poises measured at 380° C. under a shear stress of 6.5 pounds per square inch.

7. The ink composition of claim 6 wherein said perfluorocarbon interpolymer is further characterized by an analytical composition of 80–85% interpolymerized tetrafluoroethylene and 20–15% interpolymerized hexafluoropropylene.

8. The composition of claim 1 wherein said perfluorocarbon polymer composition (a) consists essentially of said interpolymer of hexafluoropropylene and tetrafluoroethylene.

9. The composition of claim 1 wherein said perfluorocarbon polymer composition (a) consists essentially of a mixture of said interpolymer of hexafluoropropylene and tetrafluoroethylene and up to 100 parts of polytetrafluoroethylene per 100 parts of said interpolymer.

10. The ink composition of claim 3 wherein said water-dispersible, heat-reactive silicone resin is characterized by curing to a tack-free state on heating for one hour at a temperature ranging from 100° to 250° C.

11. The process for preparing an aqueous dispersion ink composition for marking a perfluorcarbon resin surface which comprises combining an aqueous suspensoid of colloidal particles of a perfluorocarbon polymer composition which in 100 parts includes at least 50 parts of an interpolymer of hexafluoropropylene and tetrafluoroethylene, the remainder, 0 to 50 parts, being polytetrafluoroethylene, with a heat-resistant pigment, a water-dispersible, heat-reactive silicone resin in an amount up to 50 parts per 100 parts of said perfluorocarbon polymer, a water-immiscible volatile liquid organic diluent comprising a solvent for said silicone resin, and a dispersing agent in the presence of an aqueous medium essentially comprising water and an effective small proportion of a suspension stabilizer having the property of imparting increased viscosity to the aqueous phase sufficient to inhibit pigment settling, said dispersing agent being characterized by a hydrophile/lipophile balance which favors the formation of an oil in water dispersion, and uniformly dispersing said colloidal particles of perfluorocarbon polymer, said pigment, said silicone resin and said organic diluent in the aqueous medium as the continuous phase.

12. The process of claim 11 including the steps of predispersing said pigment in a hydrophobic vehicle essentially comprising said silicone resin, said liquid organic diluent and said dispersing agent and combining the resulting hydrophobic pigment dispersion with said aqueous suspensoid of colloidal particles of perfluorocarbon polymer in the presence of said aqueous medium containing said suspension stabilizer.

13. The method of marking a perfluorocarbon resin surface with identifying indicia which comprises applying to said surface at least one aqueous dispersion ink having the composition as defined by claim 1, heating the applied ink at a temperature above the gel temperature of the perfluorocarbon resin surface in the range of 300° to 950° for a period sufficient to coalesce said particles of perfluorocarbon polymer and bind the non-volatile residue of the ink to said perfluorocarbon resin surface, said heating period ranging from several minutes at 300° C. to several seconds at 950° C., and thereafter cooling to below the gel temperature of the perfluorocarbon resin.

14. The method of striping a wire having a surface layer thereon comprising a perfluorocarbon resin selected from polytetrafluoroethylene, interpolymer of tetrafluoroethylene and hexafluoropropylene and mixtures thereof which comprises concurrently applying in spaced relationship a plurality of stripes of inks each having the composition as defined by claim 1 to the perfluorocarbon resin surface of said wire which is moving at a uniform speed, heating said applied ink stripes by passing said striped wire through an oven having a temperature of 450° to 800° C., the rate of travel of the wire and the length of the oven being such that exposure to said oven temperature ranges from several seconds at 800° C. to about 30 seconds at 450° C., and cooling to below the gel temperature of the perfluorocarbon resin.

15. As an article of manufacture, a color-coded insulated electrical conductor wire consisting essentially of an electrically conductive metal wire, a contiguous layer of insulation consisting essentially of a perfluorocarbon resin as the organic film forming material, and on the surface of said insulating layer at least one distinguishing color mark of cured indicia ink bonded strongly thereto, said cured indicia ink being the coalesced, non-volatile residual product of heat-curing in situ, at a temperature of at least 300° C. and exceeding the gel temperature of said perfluorocarbon resin, the aqueous dispersion ink composition defined by claim 1, containing at least one said heat-resistant pigment of distinguishing color.

References Cited in the file of this patent

UNITED STATES PATENTS

| | | |
|---|---|---|
| 2,549,935 | Sauer | Apr. 24, 1951 |
| 2,681,324 | Hochberg | June 15, 1954 |